US010099720B2

United States Patent
Ramanujam et al.

(10) Patent No.: US 10,099,720 B2
(45) Date of Patent: Oct. 16, 2018

(54) STEERING SYSTEM DETECTING VEHICLE MOTION STATES

(71) Applicant: STEERING SOLUTIONS IP HOLDING CORPORATION, Saginaw, MI (US)

(72) Inventors: Rangarajan Ramanujam, Saginaw, MI (US); Scott T. Sanford, Swartz Creek, MI (US); Tejas M. Varunjikar, Rochester Hills, MI (US); Tao Yang, Midland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/434,482

(22) Filed: Feb. 16, 2017

(65) Prior Publication Data
US 2017/0232998 A1    Aug. 17, 2017

Related U.S. Application Data

(60) Provisional application No. 62/295,881, filed on Feb. 16, 2016.

(51) Int. Cl.
*B62D 5/04* (2006.01)
*B62D 15/02* (2006.01)
(Continued)

(52) U.S. Cl.
CPC .............. *B62D 5/0463* (2013.01); *B62D 6/02* (2013.01); *B62D 6/10* (2013.01); *B62D 15/025* (2013.01);
(Continued)

(58) Field of Classification Search
CPC .......... B62D 5/0463; B62D 6/02; B62D 6/10; B62D 15/025; B60Y 2300/0223; B60Y 2300/0227
See application file for complete search history.

(56) References Cited

U.S. PATENT DOCUMENTS

| 5,198,981 A | 3/1993 | Collier-Hallman et al. |
| 5,704,446 A | 1/1998 | Chandy et al. |

(Continued)

OTHER PUBLICATIONS

Varunjikar, Tejas, "Design of Horizontal Curves with Downgrades Using Low-Order Vehicle Dynamics Models," A Thesis in Mechanical Engineering, The Pennsylvania State University, The Graduate School Department of Mechanical Engineering, May 2011, pp. 1-141, University Park, Pennsylvania.

*Primary Examiner* — Dale W Hilgendorf
(74) *Attorney, Agent, or Firm* — Cantor Colburn LLP

(57) ABSTRACT

Technical features are described for a steering system to compute a state flag value that is indicative of a vehicle motion state, such as an understeer or an oversteer condition. The steering system further generates a reference torque signal based on the state flag value, and generates a motor-assist torque signal based on the reference torque signal. The state flag value indicates the vehicle motion state in both a dynamic-state or a steady-state. Further, the steering system generates the reference torque signal based on the state flag value by blending a first rack force generated based on a vehicle-speed signal and motor angle, and a second rack force generated based on a motor torque and an input torque provided to a handwheel of the steering system.

18 Claims, 11 Drawing Sheets

(51) Int. Cl.
  *B62D 6/02* (2006.01)
  *B62D 6/10* (2006.01)
  *B62D 6/00* (2006.01)
(52) U.S. Cl.
  CPC .............. *B60Y 2300/0223* (2013.01); *B60Y 2300/0227* (2013.01); *B62D 6/00* (2013.01)

(56) References Cited

U.S. PATENT DOCUMENTS

| | | |
|---|---|---|
| 6,370,460 B1 | 4/2002 | Kaufmann et al. |
| 6,625,530 B1 | 9/2003 | Bolourchi |
| 7,512,468 B2 * | 3/2009 | Tamaizumi et al. ......................... B62D 5/0463 701/41 |
| 2003/0060955 A1 * | 3/2003 | Suissa .................. B62D 15/025 701/41 |
| 2005/0256620 A1 * | 11/2005 | Kato et al. ........... B62D 5/0463 701/41 |
| 2014/0257641 A1 | 9/2014 | Champagne et al. |
| 2015/0367884 A1 | 12/2015 | George et al. |
| 2016/0264172 A1 * | 9/2016 | Oiki et al. ........... B62D 5/0463 |
| 2016/0272197 A1 * | 9/2016 | Hulten et al. ........ B62D 5/0463 |
| 2016/0280251 A1 | 9/2016 | George et al. |
| 2017/0203785 A1 * | 7/2017 | Naik et al. ........... B62D 5/0463 |

* cited by examiner

STEERING SYSTEM DETECTING VEHICLE MOTION STATES

CROSS-REFERENCES TO RELATED APPLICATIONS

This patent application claims priority to U.S. Provisional Patent Application Ser. No. 62/295,881, filed Feb. 16, 2016, which is incorporated herein by reference in its entirety.

BACKGROUND

The present application is generally related to a steering system, such as an electric power steering (EPS) system that detects near-limit vehicle conditions such as an understeer condition and oversteer condition, and that in response adjusts the torque assist that is provided to a driver.

Typically, vehicles today are equipped with a steering system such as an Electric Power Steering (EPS) system. The EPS system assists a driver to steer the vehicle in desired direction. For example, the EPS system generates an assist torque during the maneuvers to facilitate overcoming one or more forces acting on the vehicle, such as surface friction. Various driving maneuvers and environment condition (e.g. low friction surface) can lead to one or more tire forces reaching near-limit conditions. Vehicles can have undesired yaw behavior in such conditions. Such a behavior is often described as an understeer condition (vehicle yawing less than desired) or an oversteer condition (vehicle yawing more than desired). Although the society of automotive engineers (SAE) has defined such conditions in steady state situations, the situations occur in both steady state and transient (dynamic) state. Typically, electronic stability control uses selective braking and other techniques to control vehicle when understeer or oversteer conditions are detected. However, such techniques are reactive to driver maneuvers in the understeer and oversteer conditions.

Accordingly, it is desirable to improve the steering system by proactively assisting the driver with maneuvers in case of vehicle motion states such as the understeer and oversteer conditions.

SUMMARY

According to one or more embodiments, a steering system computes a state flag value that is indicative of a vehicle motion state, such as an understeer or an oversteer condition. The steering system further generates a reference torque signal based on the state flag value, and generates a motor-assist torque signal based on the reference torque signal. The state flag value indicates the vehicle motion state in both a dynamic-state or a steady-state. Further, the steering system generates the reference torque signal based on the state flag value by blending a first rack force generated based on a vehicle-speed signal and motor angle, and a second rack force generated based on a motor torque and an input torque provided to a handwheel of the steering system.

According to one or more embodiments, a method for computing an assist torque by a steering system includes detecting, by the steering system, a non-neutral vehicle motion state. In response, a blending-factor is determined based on a type of vehicle motion state. Further, the method includes generating a rack force signal by blending a first rack force from a vehicle model and a second rack force from a steering system observer model based on the blending-factor. The method further includes generating the assist torque based on the rack force signal.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings.

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Figure 1:
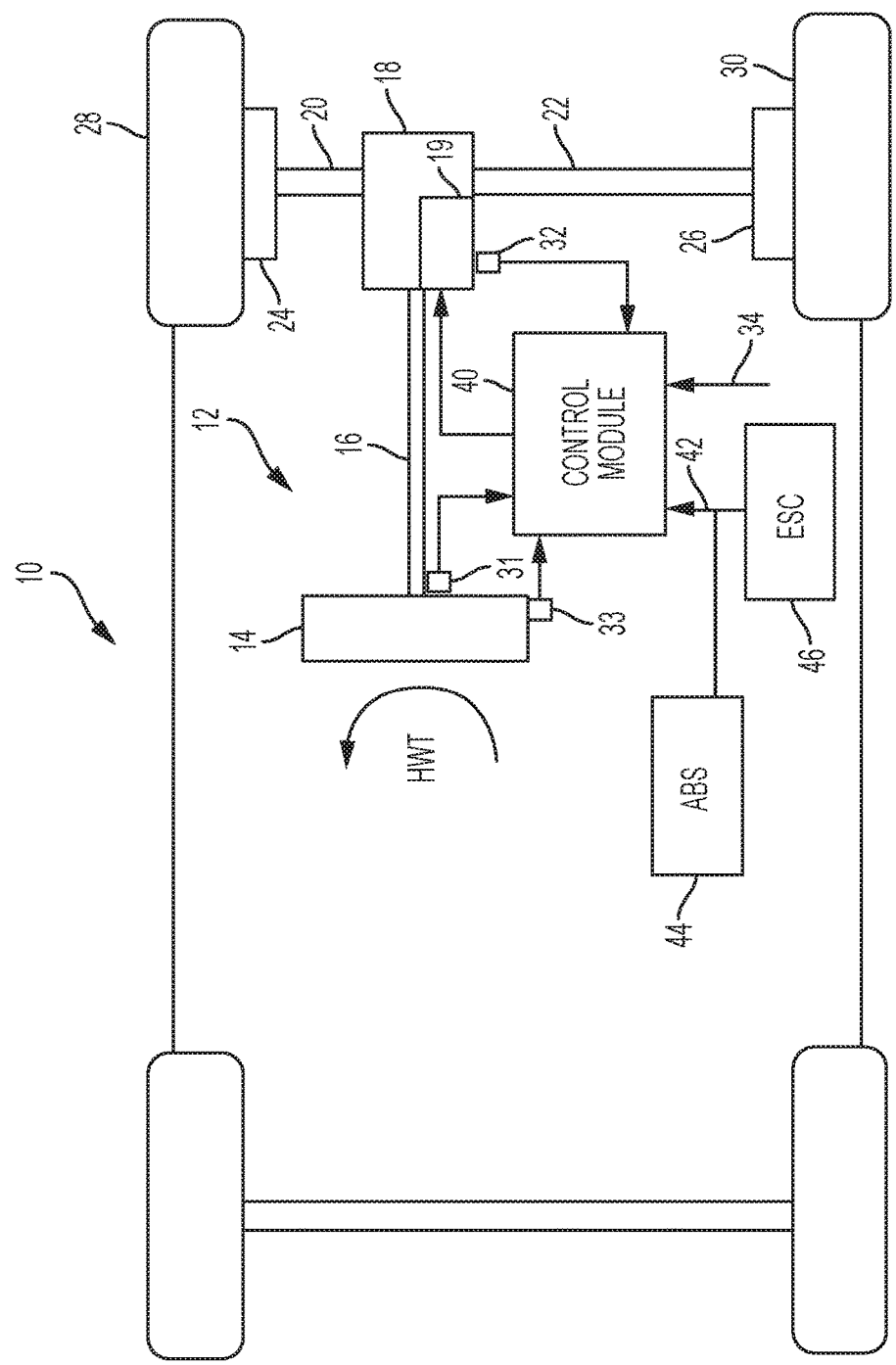
FIG. 1 illustrates a vehicle 10 including a steering system, according to one or more embodiments.

Referring now to the Figures, where the invention will be described with reference to specific embodiments, without limiting same, FIG. 1 illustrates a vehicle 10 including a steering system 12 according to one or more embodiments. In various embodiments, the steering system 12 includes a handwheel 14 coupled to a steering shaft system 16 which includes steering column, intermediate shaft, & the necessary joints. In one exemplary embodiment, the steering system 12 is an EPS system that further includes a steering assist unit 18 that couples to the steering shaft system 16 of the steering system 12, and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled through the steering shaft system 16 to a steering actuator motor 19 and gearing. During operation, as a vehicle operator turns the handwheel 14, the steering actuator motor 19 provides the assistance to move the tie rods 20, 22 that in turn moves steering knuckles 24, 26, respectively, coupled to roadway wheels 28, 30, respectively of the vehicle 10.

It should be noted that while the steering system 12 illustrated in FIG. 1 has a mechanical connection between handwheel 14 and roadway wheels 28, 30, in other examples the steering system 12 may use a drive by wire mechanism (not shown). The drive by wire system does not have a direct mechanical connection between the handwheel and the roadway wheel. Typically, in drive by wire system, the handwheel unit is used to provide appropriate torque feedback to the driver; and the handwheel position from a sensor is used to do position control for the tie rods 20, 22. However, even in that case, this invention can be used to provide appropriate torque feedback to the driver at handwheel unit using proposed inputs.

As shown in FIG. 1, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses an input driver handwheel torque (HWT) applied to the handwheel 14 by the operator of the vehicle 10. The torque sensor generates a driver torque signal based thereon. In another example, the sensor 32 is a motor angle and speed sensor that senses a rotational angle as well as a rotational speed of the steering actuator motor 19. In yet another example, the sensor 33 is a handwheel position sensor that senses a position of the handwheel 14. The sensor 33 generates a handwheel position signal based thereon.

A control module 40 receives the one or more sensor signals input from sensors 31, 32, 33, and may receive other inputs, such as a vehicle-speed signal 34. The control module 40 may be a processing circuit, such as an electronic control unit (ECU), which includes one or more microprocessor, memory, storage, cache and other hardware components. In one or more examples, the control module 40 implements one or more methods described herein by executing one or more computer executable instructions.

The control module 40 generates a command signal to control the steering actuator motor 19 of the steering system 12 based on one or more of the inputs and further based on the steering control systems and methods of the present disclosure. The steering control systems and methods of the present disclosure apply signal conditioning and perform friction classification to determine a surface-friction level 42 as a control signal that can be used to control aspects of the steering system 12 through the steering assist unit 18. Alternatively, or in addition, the surface-friction level 42 may be received from one or more components of the vehicle 10, such as from an anti-lock braking system (ABS) 44 and/or from an electronic stability control (ESC) system 46. Communication with the ABS 44, ESC system 46, and other components (not depicted), can be performed using, for example, a controller area network (CAN) bus or other vehicle network known in the art to exchange signals such as the vehicle-speed signal 34. Typically, the ESC system uses selective braking and other techniques to control vehicle when irregular surface-friction is detected, which may result in a vehicle motion state such as an understeer condition or an oversteer condition.

The technical solutions described herein improve the steering system 12 by facilitating the steering system 12, which is a component of the vehicle 10 that the driver is typically in constant contact with, to proactively indicate to the driver a vehicle motion state such as an understeer condition and an oversteer condition. For example, the technical solutions herein facilitate the steering system 12 to detect one or more types of vehicle motion states and adjust the assist torque in response. Accordingly, the steering system 12 communicates front axle forces to the driver.

For example, the steering systems 12 may use torque measured by the one or more torque sensors 31-33 and calculate an assist torque using a table, such as a boost curve table, and digital filters. Alternatively, or in addition, in typical closed-loop EPS system, a reference torque generated from a model and the measured torque are used to do closed loop control of the EPS system. In steering systems using either of these techniques, the technical solutions herein facilitate improvement based on knowledge of the vehicle states, such as the understeer and/or the oversteer condition, by facilitating torque/effort communication to the driver.

For example, in case the steering system 12 is a closed loop steering system, the hand-wheel angle may be used to calculate a desired handwheel torque, where the desired handwheel torque is an effort that the driver expects during driving. Alternatively, or in addition, the steering system 12 may predict the vehicle's rack force and use the calculated rack force to determine the desired driver torque efforts. A handwheel angle/position signal could be used, in addition to one or more other inputs, such as a vehicle-speed signal, to predict the vehicle rack force. Such a prediction may facilitate the steering system 12 to be robust to surface-friction and vehicle platform changes, and maintain a consistent steering feel during vehicle operation. However, such force predictions may not always match real rack force, especially in nonlinear region of tire operation, such as in the oversteer and/or the understeer conditions, which may be caused by a lower friction surface. In these conditions, an alternate rack force prediction scheme that relies on one or more input signals such as handwheel torque, motor torque, and the like, to estimate rack force and is robust to tire nonlinearities or surface friction changes.

Thus, the technical features provided by the technical solutions include facilitating the steering system 12 a detection scheme for near-limit conditions of the tires. Further, the technical features include a blending scheme to transition/combine the usage of position-based and estimated rack force predictions. Accordingly, the steering system 12 maximizes usage of the model based approach and also conveys appropriate efforts to driver at limit conditions.

Figure 2:
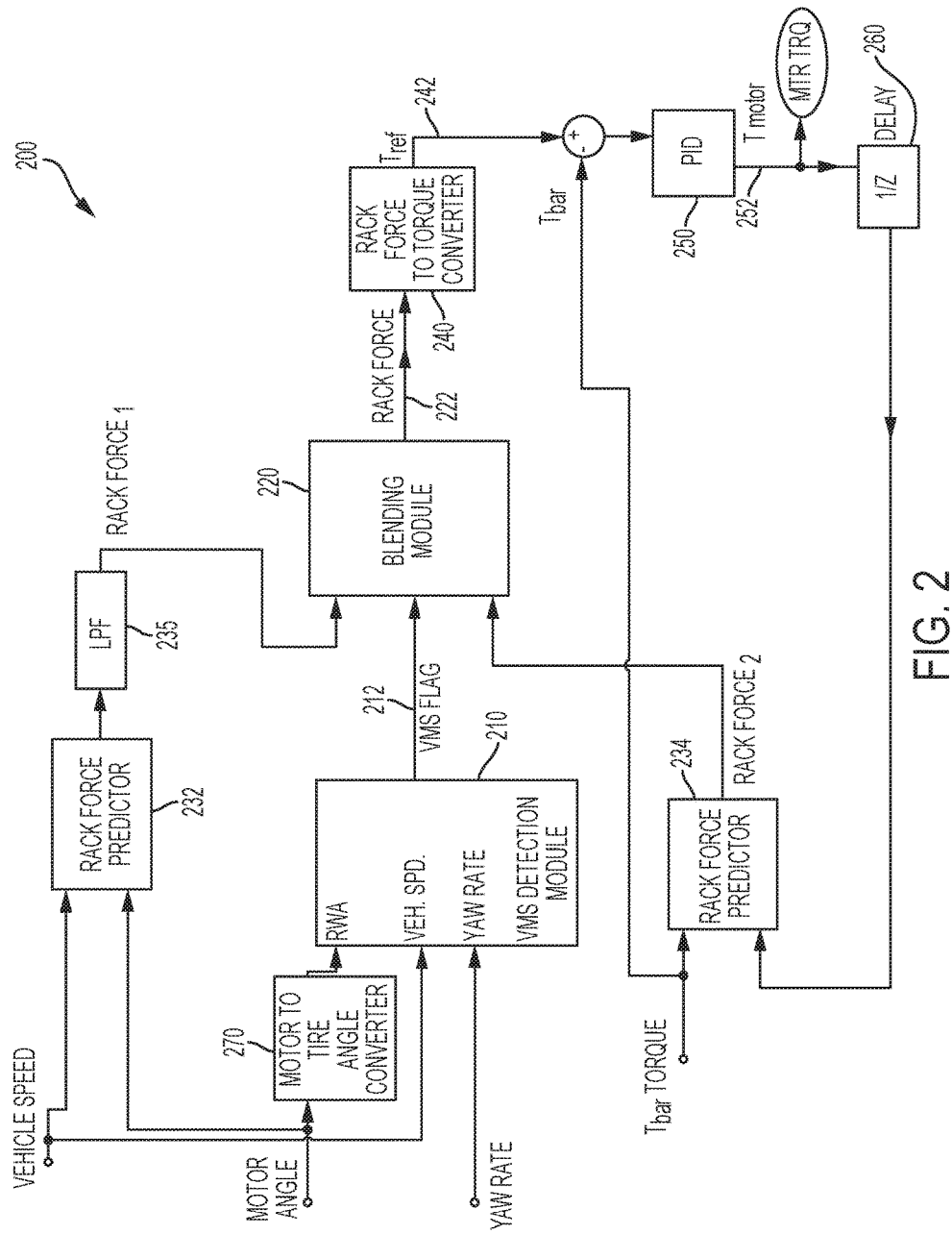
FIG. 2 illustrates components and data flow for a vehicle motion state module, according to one or more embodiments.

For example, FIG. 2 illustrates components and data flow for a vehicle motion state module 200, according to one or more embodiments. In one or more examples, the vehicle motion state module 200 is part of the control module 40. Alternatively, in one or more examples, the vehicle motion state (VMS) module 200 is separate from the control module 40, and includes a separate processing circuit, memory and other hardware components.

The VMS module 200 includes a VMS detection module 210, and a blending module 220, among other components.

The VMS detection module 210 detects vehicle motion states, such as the understeer and oversteer conditions. The VMS detection module 210 indicates the vehicle motion states to the blending module 220. For example, the VMS detection module 210 computes a VMS flag 212 that is sent to the blending module 220. The blending module 220 implements a blending scheme to compute a rack force by combining rack forces computed using multiple rack force modules based on the VMS flag 212. The VMS flag 212 is thus a blending-factor that the blending module 220 uses for computing the rack force. For example, the blending module 220 receives a first rack force from a first rack force prediction module 232 and a second rack force from a second rack force prediction module 234.

For example, the VMS flag 212 may range in the [0, 1] range. It should be noted that in other examples, a different range may be used. In the above example, the VMS flag value being 0 may represent that the position-based rack force prediction is to be solely used as the rack force output, and the value being 1 may represent that the estimated rack force prediction is to be solely used as the rack force output. The VMS flag values between 0 and 1 may indicate weight factors to use for blending the rack force predictions from both models. For example, if the VMS flag value is V (0<=V<=1), the rack force output may be computed as the sum of V×position-based rack force and (1−V)×estimated rack force. Other examples may use a different weighting factor scheme than the above example. Such blending scheme facilitates gradual transition and prevents sharp changes in hand wheel efforts to the driver. The gradual transition further ensures robustness at normal driving conditions and communication of accurate efforts to driver at limit conditions.

It should be noted that the rack force computation models described above are exemplary, and that in other examples, the rack force may be computed using different methods or their combinations, such as a nonlinear vehicle model, an observer, friction model, tie-rod sensor measurements and the like.

Referring back to FIG. 2, the rack force 222 output from the blending module 220 is used to calculate a reference torque (T_ref) 242. A closed-loop proportional-integral controller (PID controller) 250 computes a motor torque (T_motor) 252 using the T_ref 242, by a rack force to torque converter 240, and a torque provided by the driver (T_bar) during maneuvering the handwheel 14. T_motor is used to generate an assist command (MtrTrq), which provides the assist torque by the steering system 12 during the maneuvers.

The system 200 further includes a first rack force prediction module 232. The first rack force prediction module may be a position-based rack force prediction module. In one or more examples, the first rack force prediction module 232 receives the vehicle speed and a motor angle signals, and generates a first rack force value. Here the motor angle signal is indicative of a position of the motor 19 of the steering system 12. In one or more examples, the output of the first rack force prediction module 232 may be passed through a low pass filter 235. The first rack force value is then sent to the blending module 220 for computing the output rack force as described earlier.

The system further includes a second rack force prediction module 234. The second rack force prediction module 234 may use the EPS torque values, such as the motor torque 252 and the input torque to estimate a second rack force value. In one or more examples, the second rack force prediction module 234 may add the input torque values, and low pass filter the result to provide the second rack force as output. Alternatively, the second rack force prediction module 234 computes the second rack force using different input values, and/or using different computing methods, for example using an observer model based on steering system signals. For example, a delayed T_motor 252, using a delay module 260, is provided to the second rack force prediction module 234. The estimated rack force module 234, in one or more examples, uses the delayed T_motor 252 and the T_bar torque from the driver to estimate the second rack force value. The second rack force value is then forwarded to the blending module 220 for computing the output rack force as described earlier, based on the VMS flag 212. Thus, the blending module 220 receives two separate rack force prediction values from two separate models. Typically, the first rack force predicted by the position-based module is smoother than the second rack force provided by the observer module, however, in near-limit conditions the second rack force facilitates generating feedback for the driver because of the coarseness of the second rack force compared to the first rack force.

The VMS detection module 210 computes the VMS flag 212 based on the vehicle speed, a yaw-rate, and a road-wheel angle signals. In one or more examples, these inputs are received from one or more sensors. Alternatively, or in addition, the system 200 includes a motor to tire angle converter 270 that computes the road-wheel angle signal based on the motor angle signal. The motor angle signal is indicative of the position of the motor 19 of the steering system 12. For example, the motor to tire angle converter 270 uses a look-up table to determine the road-wheel angle corresponding to a value of the motor angle signal.

Figure 3:
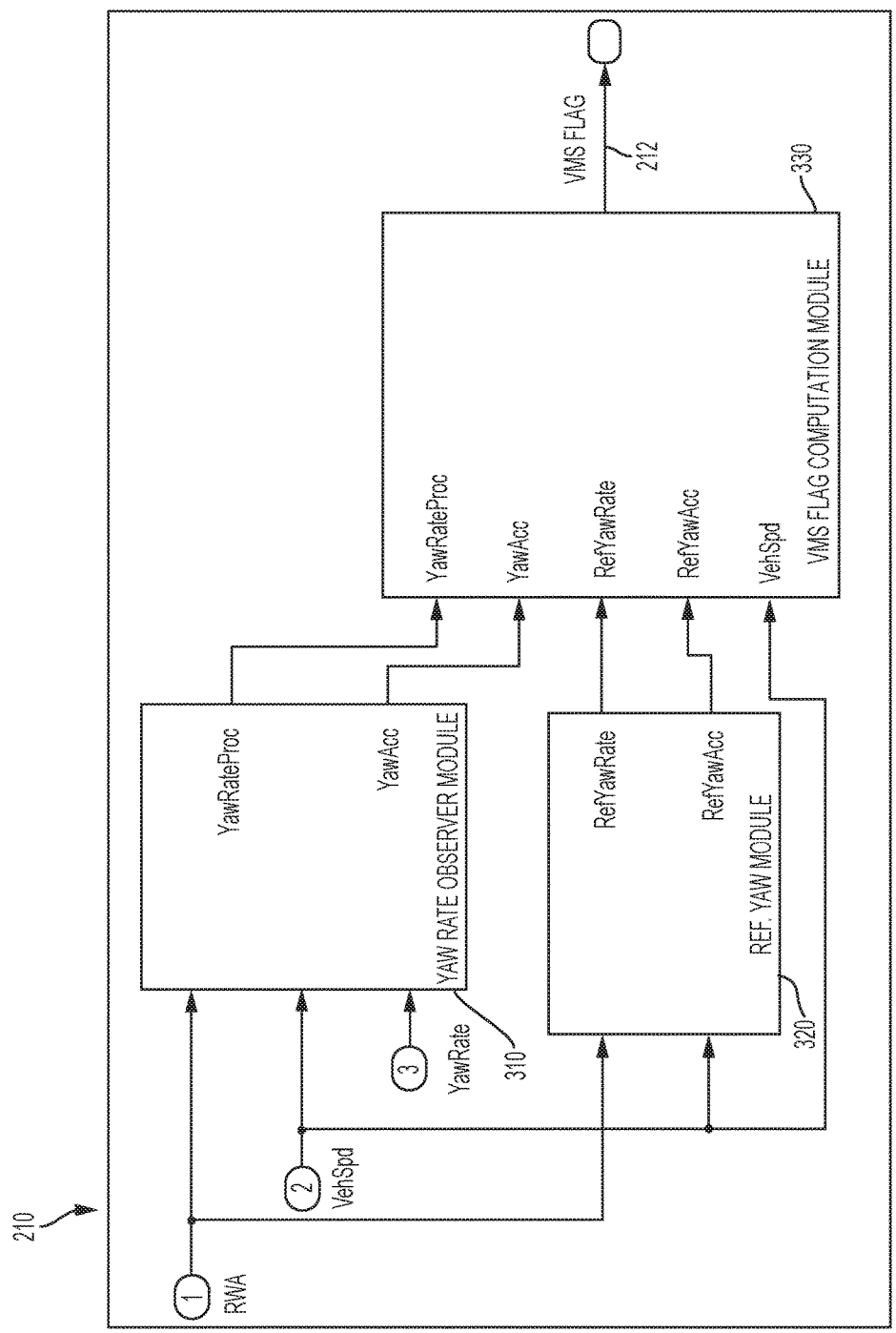
FIG. 3 illustrates example components and data flow for a vehicle motion state detection module for computing a vehicle motion state flag, according to one or more embodiments.

FIG. 3 illustrates components and data flow for the VMS detection module 210 for computing the VMS flag 212, according to one or more embodiments. In one or more examples, the VMS detection module 210 includes, among other components, a yaw-rate observer module 310, a reference yaw module 320, and a VMS flag computation module 330.

The yaw-rate observer module 310 is a signal processing module that processes the yaw-rate signal and calculates a yaw-acceleration. In one or more examples, the yaw-rate observer module 310 uses a steady-state Kalmann filter to estimate/predict the yaw-rate and yaw-acceleration to reduce noise and lag. The reference yaw module 320 uses a reference linear model, such as a linear bicycle model and a first order tire relaxation model, to generate a reference yaw-rate and yaw-acceleration. For example, the reference yaw module 320 computes the reference yaw-rate and yaw-acceleration using the road-wheel angle (RWA) and vehicle-speed signals. As described earlier, the RWA signal may be obtained from the motor angle based on vehicle measurements. The VMS flag computation module 330 computes a value of the VMS flag 212 by comparing the reference yaw-rate and acceleration values from the reference yaw module 320 and the yaw-rate and yaw-acceleration values generated by the yaw-rate observer module 310 signals. The comparison is used to determine whether the vehicle 10 is in understeer or oversteer state (corresponding to flag 1).

Figure 4:
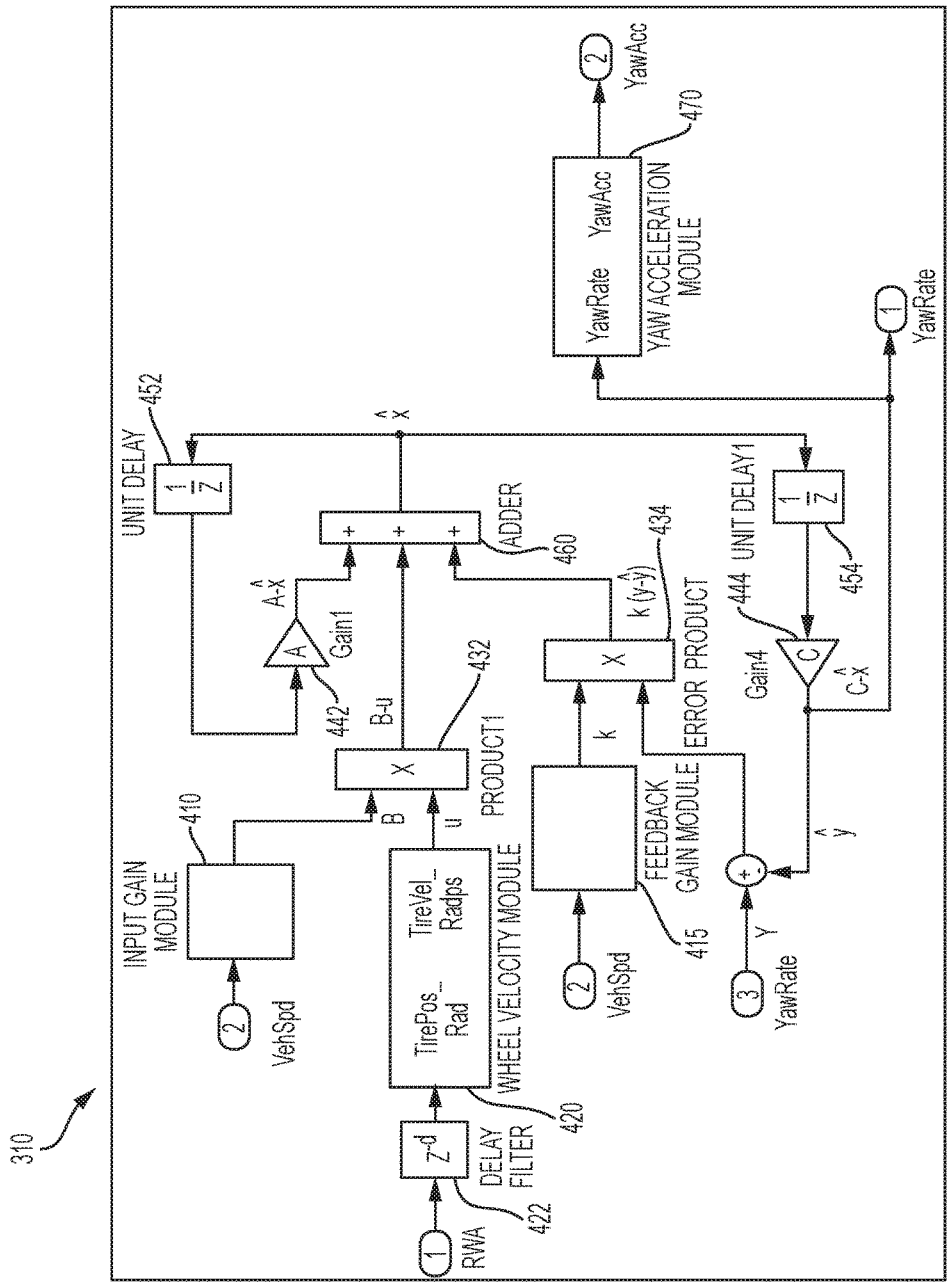
FIG. 4 illustrates example components and data flow for a yaw-rate observer module, according to one or more embodiments.

FIG. 4 illustrates components and data flow for an example yaw-rate observer module 310, according to one or more embodiments. The yaw-rate observer module 310 uses RWA, vehicle speed, and measured yaw-rate (measured) signals and outputs YawRate and YawAcc signals. In one or more examples, the YawRateProc signal is computed by adjusting the measured yaw-rate signal using the RWA and the vehicle-speed signals.

The vehicle-speed signal is used to calculate an input gain B and a feedback gain K using an input gain module 410 and a feedback gain module 415, respectively. In one or more examples, the input and feedback gain modules 410-415 include corresponding lookup tables to convert the vehicle-speed signal into the gains B and K.

The RWA signal is used to compute a rotation velocity (u) of the wheels, for example in radians per second, by a wheel velocity module 420. In one or more examples, the wheel velocity module 420 receives a delayed RWA via a delay filter 422, and then differentiates as well as low-pass filters the input RWA to compute u. the yaw-rate observer module uses the following equation:

$$\hat{x}[k+1] = A \cdot \hat{x} + B \cdot u + K(y - \hat{y})  \quad \text{Equation (1)}$$

where $\hat{y} = C\hat{x}$, $\hat{x}$ is a state estimate, $\hat{y}$ is yaw-rate estimate, y is the measured yaw-rate signal; A is system dynamics gain, B is the input gain, K is the feedback gain. Accordingly, the yaw-rate observer module 310 includes a product module 432 that computes a product (B·u) of the input gain B and the wheel velocity u. The output from the previous iteration is passed through a delay module 452 and scaled by a gain module 442 using the system dynamics gain to compute A·$\hat{x}$. The system dynamics gain A is a predetermined factor for the vehicle 10.

Further, the output from the previous iteration is delayed by delay module 454 and scaled by a gain module 444 using the predetermined output gain C to compute $\hat{y} = C\hat{x}$, which is an estimated or predicted yaw-rate according to the observer model. An error between the measured yaw-rate y and the estimated yaw-rate is then computed and scaled by a product module 434 using the feedback gain K to compute $K(y-\hat{y})$. The outputs from the product module 432, the product module 434, and the gain module 442 are added by an adder module 460 to produce the output for the current iteration $\hat{x}[k+1]$.

Further, the yaw-rate prediction $\hat{y}$ is forwarded to a yaw-acceleration module 470 that computes the yaw-acceleration. In one or more examples, the yaw-acceleration module differentiates and low pass filters the received yaw-rate to compute the yaw-acceleration.

Figure 5:
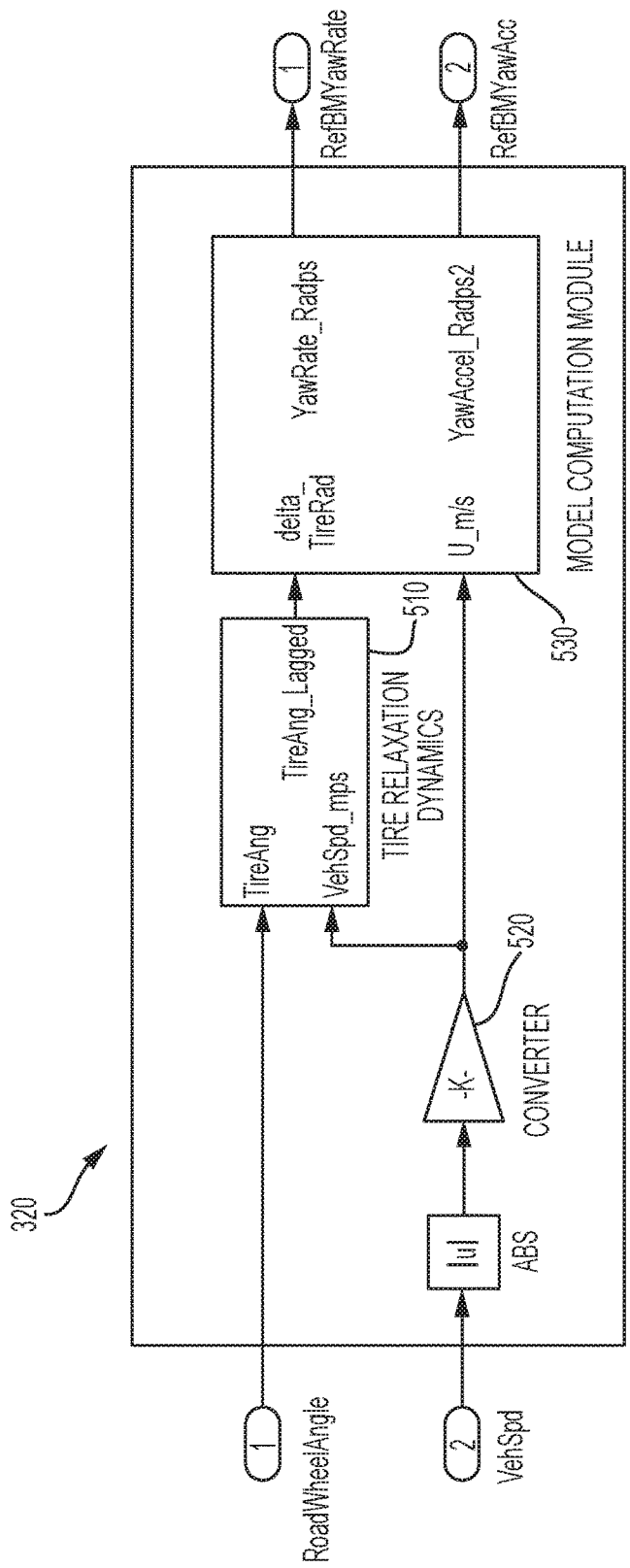
FIG. 5 illustrates example components and data flow of a reference yaw module, according to one or more embodiments.

FIG. 5 illustrates components and data flow of the reference yaw module 320, according to one or more embodiments. The reference yaw module 320 illustrated uses a linear bicycle model, however it should be noted that in other examples, a different model may be used to generate a reference yaw-rate and a reference yaw-acceleration.

The reference yaw module 320 may use force and moment balance equations at the front and rear axles of bicycle model, and a linear tire relaxation model to represent the lateral force vs slip angle relationship. For example, equations used in the model may be $$m(\dot{V} + rU) = F_{cf} + F_{cr}  \quad \text{Equation (2); and}$$

$$I_{zz}\dot{r} = a \cdot F_{cf} - b \cdot F_{cr}  \quad \text{Equation (3)}$$

where, V=lateral speed of center of gravity (CG) of the vehicle 10, r=yaw-rate of CG of the vehicle 10, a=distance of front axle from CG of the vehicle 10, b=distance of rear axle from CG of the vehicle, $I_{zz}$=moment of inertia about z axis, $F_{cf}$=tire force of front axle, and $F_{cr}$=tire force of rear axle.

Further, $$F_{cf} = C_{af} \cdot \alpha_f  \quad \text{Equation (4)}$$

$$F_{cr} = C_{ar} \cdot \alpha_r  \quad \text{Equation (5)}$$

where, $C_{af}$=cornering stiffness for front axle, $C_{ar}$=cornering stiffness for rear axle, and $$\alpha_f = \frac{V + ar}{U} - \delta  \quad \text{Equation (6)}$$

$$\alpha_r = \frac{V - br}{U}  \quad \text{Equation (7)}$$

where, $\alpha_f$ and $\alpha_r$ are slip angles of front and rear axles respectively. Traditionally $C_{af}$ and $C_{ar}$ are predetermined constants, however to take the vehicle motion states into consideration, the technical features herein compute the $C_{af}$ and $C_{ar}$ values as functions of vehicle speed, as seen above. It should be noted that in other examples different functions, such as non-linear functions may be used for computing the $C_{af}$ and $C_{ar}$ values.

Referring to FIG. 5, the reference yaw module 320 receives the RWA signal, which is predicted signal based on motor angle. In one or more examples, the motor angle from the motor 19 of the steering system 12 is converted to the RWA using tire angle measurements. Further, in one or more examples, the predicted RWA signal is passed through a tire relaxation dynamics module 510. The tire relaxation dynamics module 510 applies a vehicle speed dependent low pass filter to the RWA signal. The low pass filter adds a delay to the calculation of the reference yaw-rate. The delay ensures replication of the tire dynamics. Without such a delay the calculation may inappropriately lead the actual yaw-rate. Accordingly, the tire relaxation dynamics module 510 outputs a lagged RWA to a model computation module 530.

Further, the reference yaw module 320 receives the vehicle-speed signal. In one or more examples, the vehicle-speed signal is converted from one unit to another, for example KPH to MPH (or vice versa) by a converter module 520. The vehicle-speed signal is then used for delaying the RWA signal by the tire relaxation dynamics module 510. Further, the vehicle-speed signal is forwarded to the model computation module 530 for the one or more computations described above.

Figure 6:
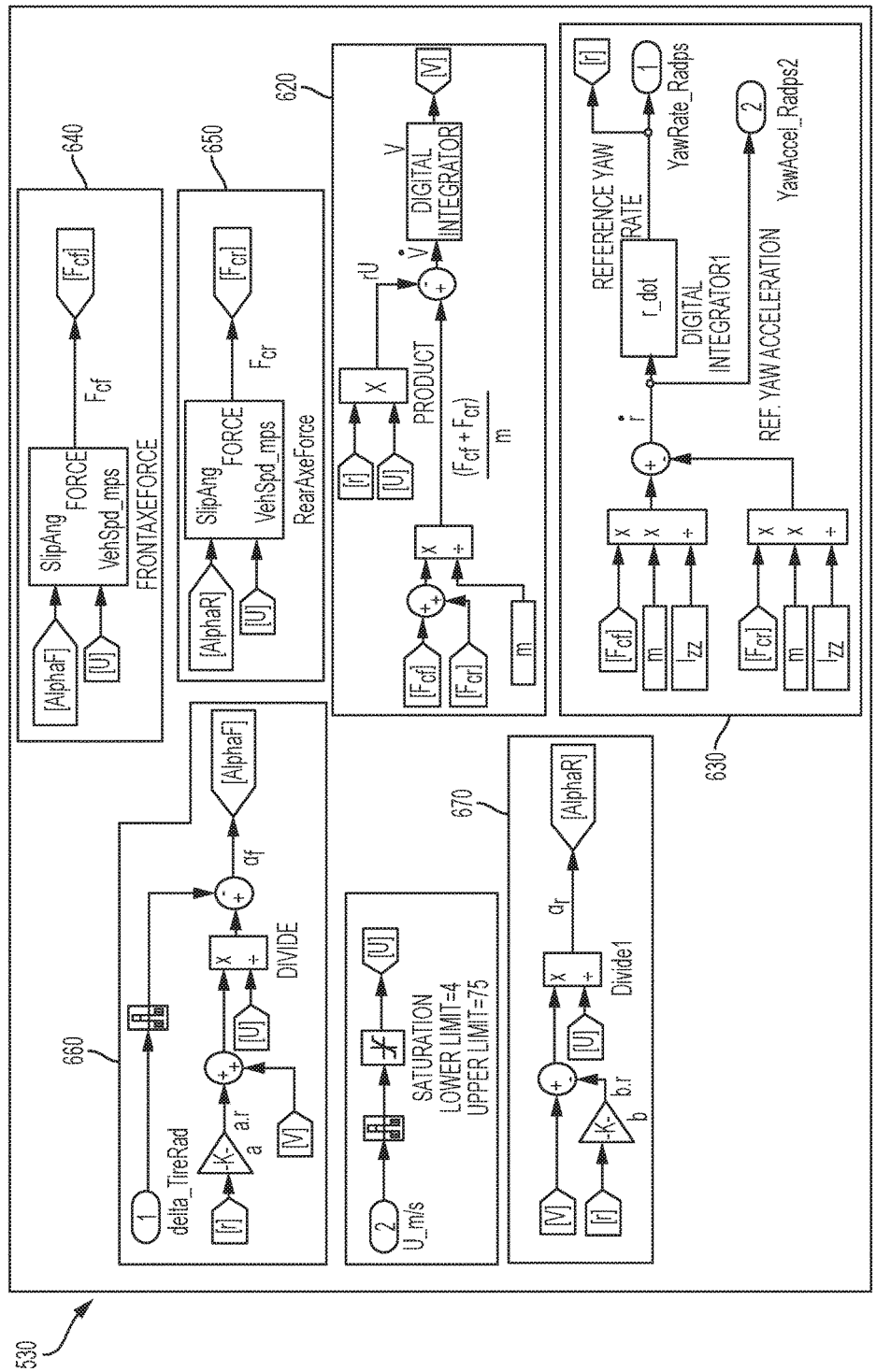
FIG. 6 illustrates example components and data flow of a model computation module, according to one or more embodiments.

FIG. 6 illustrates components and data flow of the model computation module 530, according to one or more embodiments. The model computation module receives the vehicle speed and the delayed RWA as input and computes the reference yaw-rate and the reference yaw-acceleration signals using the one or more equations described above. FIG. 6 illustrates hardware implementations for computing the yaw-rate and the reference yaw-acceleration signals. For example, the modules 640-670 compute the equations 4-7 respectively. Further, the module 620 illustrates computing values of $\dot{V}$ and V (by integrating $\dot{V}$ according to the equation 2. The module 630 computes the reference yaw-rate r (rad/sec) by integrating a computed reference yaw-acceleration $\dot{r}$ (rad/sec²) according to equation 3.

Referring back to FIG. 3, the yaw-rate and yaw-acceleration output by the yaw-rate observer module 310 (see FIG. 4), and the reference yaw-rate and the reference yaw-acceleration output by the reference yaw module 320 (see FIG. 5) are received by the VMS flag computation module 330. The VMS flag computation module 330 uses these input signals to compute the VMS flag 212 value within a predetermined range, such as [0, 1]. In one or more examples, the VMS flag computation module 330 characterizes the vehicle 10 into two different states: dynamic state 750, and steady state 740, based on a yaw-rate error and a yaw-acceleration error. Further, respective checking conditions are used to determine flag values for dynamic state VMS and steady state VMS.

Figure 7:
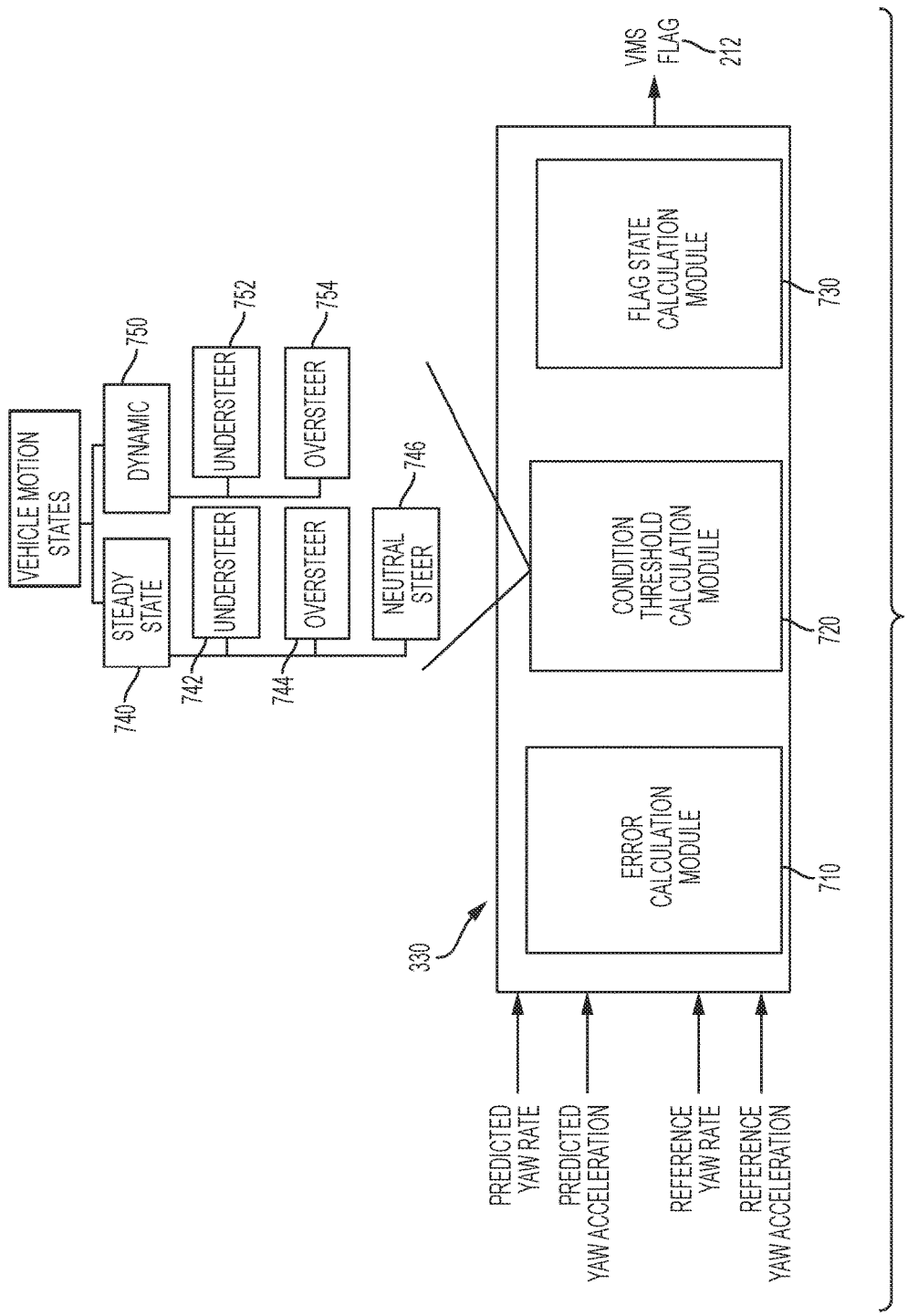
FIG. 7 illustrates example components and dataflow for vehicle motion state flag computation module, according to one or more embodiments.

FIG. 7 illustrates example components and dataflow for the VMS flag computation module 330, according to one or more embodiments. The VMS flag computation module 330 includes, among other components, an error calculation module 710, a condition threshold calculation module 720, and a flag state calculation module 730.

Figure 8:
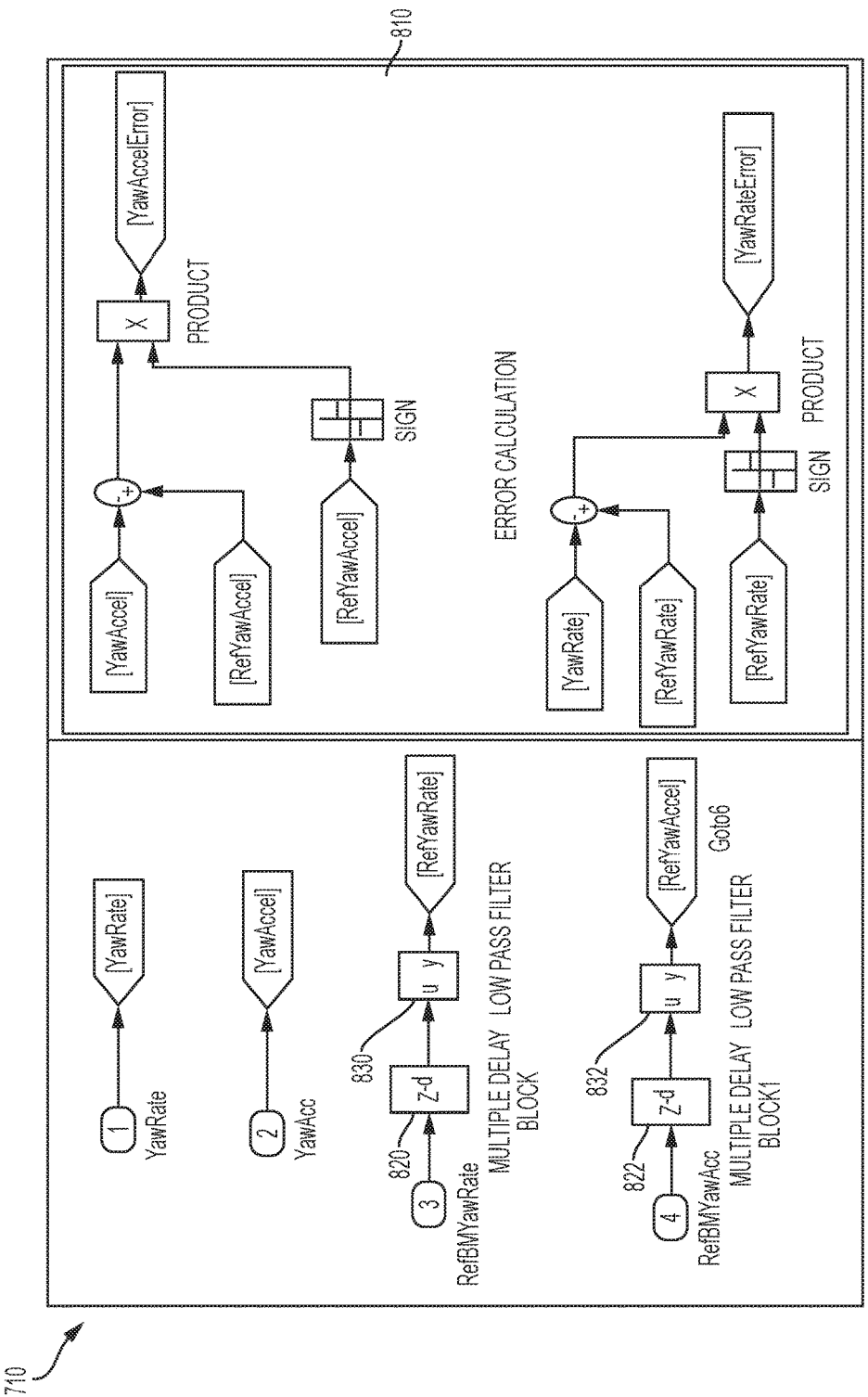
FIG. 8 illustrates example components and dataflow for an error calculation module, according to one or more embodiments.

FIG. 8 illustrates example components and dataflow for the error calculation module 710, according to one or more embodiments. The error calculation module 710 uses the reference yaw-rate and the reference yaw-acceleration from the reference yaw module 320 to compute a deviation/error with respect to the yaw-rate and the yaw-acceleration respectively that are predicted or estimated by the yaw observer module 310. The signs of the reference yaw-rate and the reference yaw-acceleration are considered while calculating the error as shown in FIG. 8. For example, the error calculation module 710 computes the yaw-rate error according to the equation $$\text{YawRateError}(e_{yaw}) = \text{sgn}(r_{ref}) * (r_{ref} - r_{veh});$$

and the yaw-acceleration error according to the equation $$\text{YawAccelError}(e_{yawaccel}) = \text{sgn}(\dot{r}_{ref}) * (\dot{r}_{ref} - \dot{r}_{veh}).$$

where, $r_{ref}$: RefYawRate; $r_{est}$: YawRateEst; $\dot{r}_{ref}$: RefYawAccel; and $\dot{r}_{est}$: YawAccEst.

In one or more examples, the reference yaw-rate from the reference yaw module 320 is delayed and low pass filtered by a delay module 820 and a low pass filter module 830 before computing the yaw-rate error. Further, in one or more examples, a delay module 822 and a low pass filter 832 delay and filter the reference yaw-acceleration value from the reference yaw module 320 prior to computing the yaw-acceleration error.

Referring back to FIG. 7, the condition threshold calculation module 720 generates vehicle speed dependent thresholds/dead bands for each of the 4 conditions of the vehicle 10 as mentioned above—dynamic-state understeer 752, dynamic-state oversteer 754, steady-state understeer 742, and steady-state oversteer 744. In one or more examples, if the vehicle condition does not meet any of the four states, the vehicle 10 is considered to be in a neutral steer condition 746, that is, the vehicle 10 is within the limits of the tire force saturation. The steady-state 740 and the dynamic-state 750 are classified based on abruptness of vehicle motion, which can be determined using the yaw-rate and the yaw-acceleration measurements and predictions. For example, deviations between predicted values of the yaw-rate and yaw-acceleration and actual values of yaw-rate and yaw-acceleration respectively facilitate classifying the vehicle motion state as a steady-state or a dynamic-state. For example, an abrupt maneuver, such as hard-braking, sudden swerve/turn, or the like may lead the vehicle to be in a dynamic-state; while, a steady-state may represent the vehicle 10 cruising with minimal direction changes at a steady speed, vehicle at rest, a mooth turn without abrupt maneuvers, and the like.

Figure 9:
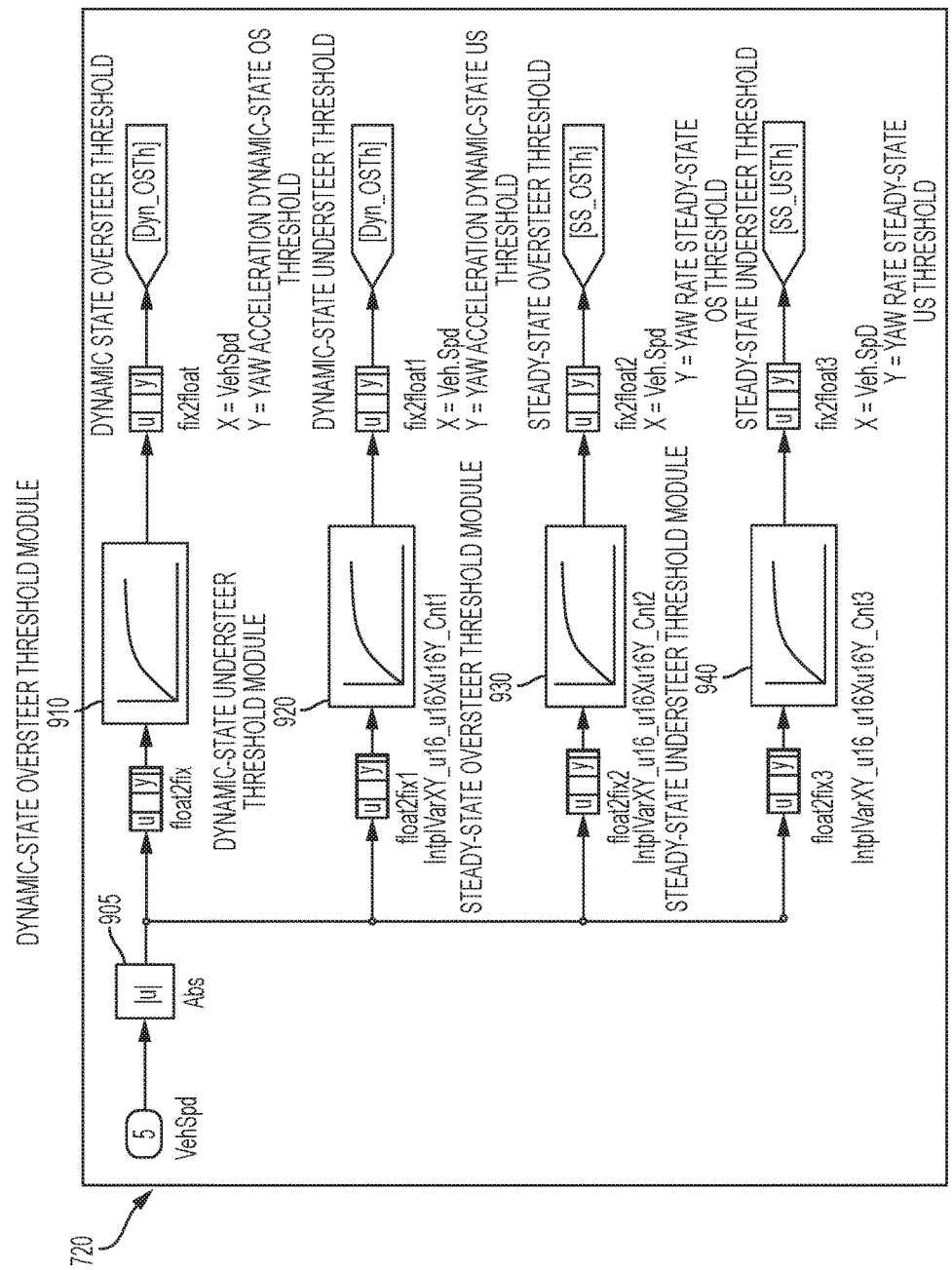
FIG. 9 illustrates example components and dataflow for a condition threshold calculation module, according to one or more embodiments.

FIG. 9 illustrates example components and dataflow for the condition threshold calculation module 720, according to one or more embodiments. In one or more examples, the thresholds/dead-bands are tunable and are calibrated based on the performance of the vehicle 10. For example, in the depicted FIG. 9, the vehicle-speed signal is used to determine the thresholds for each of the vehicle condition described herein. In one or more examples, an absolute value of the vehicle speed is computed by an modulo module 905. Alternatively, or in addition, the thresholds may be made dependent on road surface friction.

The vehicle speed is used by a dynamic-state oversteer threshold module 910 to determine a dynamic-state oversteer threshold (e1). In one or more examples, the dynamic-state oversteer threshold module 910 includes a look-up table that provides a yaw-acceleration threshold value as the dynamic-state oversteer threshold (e1) based on the vehicle speed value. Further, a dynamic-state understeer threshold module 920 determines a dynamic-state understeer threshold (e2) based on the vehicle-speed signal. In one or more examples, the dynamic-state understeer threshold module 920 includes a look-up table that provides a yaw-acceleration threshold value as the dynamic-state understeer threshold (e2) based on the vehicle speed value.

Further, a steady-state oversteer threshold module 930 determines a steady-state oversteer threshold (e3) based on the vehicle-speed signal. In one or more examples, the steady-state oversteer threshold module 930 includes a look-up table that provides a yaw-rate threshold value as the steady-state oversteer threshold (e3) based on the vehicle speed value. Further yet, a steady-state understeer threshold module 940 determines a steady-state understeer threshold (e4) based on the vehicle-speed signal. In one or more examples, the steady-state understeer threshold module 940 includes a look-up table that provides a yaw-rate threshold value as the steady-state understeer threshold (e4) based on the vehicle speed value.

Referring back to FIG. 7, the VMS flag computation module 330 further includes the flag state calculation module 730 that compares the yaw-rate error and the yaw-acceleration error with the thresholds computed by the condition threshold calculation module 720. In one or more examples, the yaw-acceleration error is compared with the respective dynamic-state thresholds to generate either dynamic-state US or OS flags. If the dynamic-state thresholds, or in other words the yaw-acceleration is not conclusive, the yaw-rate error is further used to generate either a steady-state US or OS flag. Because all limit conditions for the tire(s) fall under the steady-state conditions 740 and dynamic-state conditions 750, if any of the flags is set, the vehicle 10 is in a dynamic or steady state limit condition. In one or more examples, To prevent instantaneous flag changes, the output is low pass filtered to generate a number between 0 and 1. However, a rate limiter or another equivalent scheme could also be used to make flags transition smoothly.

Figure 10:
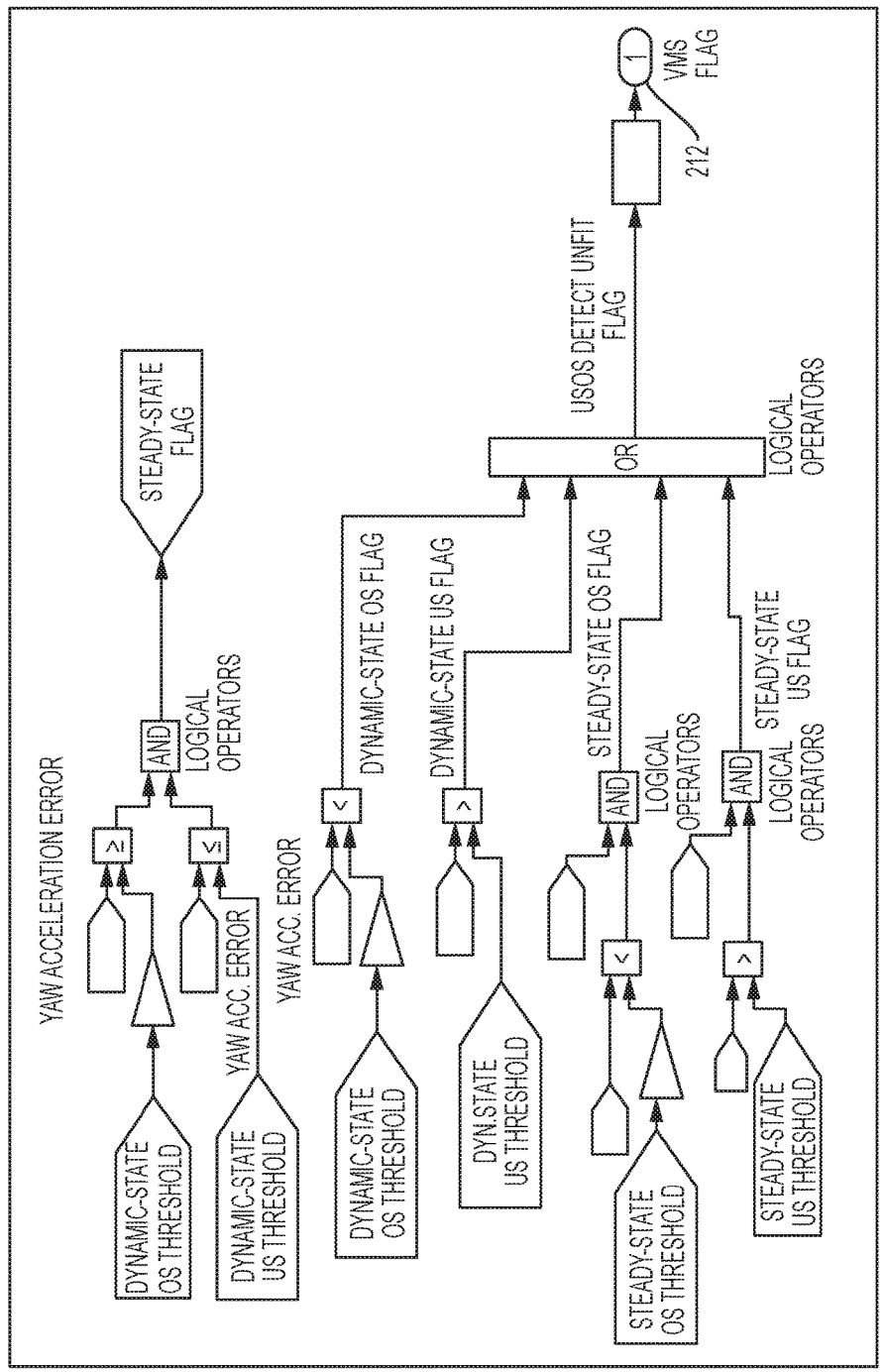
FIG. 10 illustrates example components and data-flow for a flag state calculation module, according to one or more embodiments.

FIG. 10 illustrates example components and data-flow for the flag state calculation module 730, according to one or more embodiments. The flag state calculation module 730 includes processing circuity that operates according to the following equations.

If $e_{yawaccel} > e1$, Dynamic US Flag=TRUE; else
 Dynamic US Flag=FALSE

If $e_{yawaccel} < -e2$, Dynamic OS Flag=TRUE; else
 Dynamic OS Flag=FALSE

If $e_{yaw} > e3$, Steady State US Flag=TRUE; else
 Steady State US Flag=FALSE

If $e_{yaw} < -e4$, Steady State OS Flag=TRUE; else
 Steady State OS Flag=FALSE where, e1=dynamic-state understeer threshold; e2=dynamic-state oversteer threshold; e3=steady-state understeer threshold; e4=stead-state oversteer threshold; $e_{yawaccel}$=yaw-acceleration error; and $e_{yaw}$=yaw-rate error.

The yaw-acceleration error and the yaw-rate error are computed by the error calculation module 710, and the thresholds are determined by the condition threshold calculation module 720.

If any of the flags above are computed to be TRUE, a USOS_Detect_UnfiltFlag is set to value of 1 (TRUE); otherwise it is set to value of 0 (FALSE). The USOSDetect_UnfiltFlag is further filtered to get the VMS flag 212 that varies continuously between 0 and 1.

Referring back to FIG. 2, the blending module 220 receives the VMS flag 212 and executes a scaled blending of the outputs of the rack force predictor 232 that is based on the vehicle model and the rack force predictor 234 that is based on the EPS signals.

Figure 11:
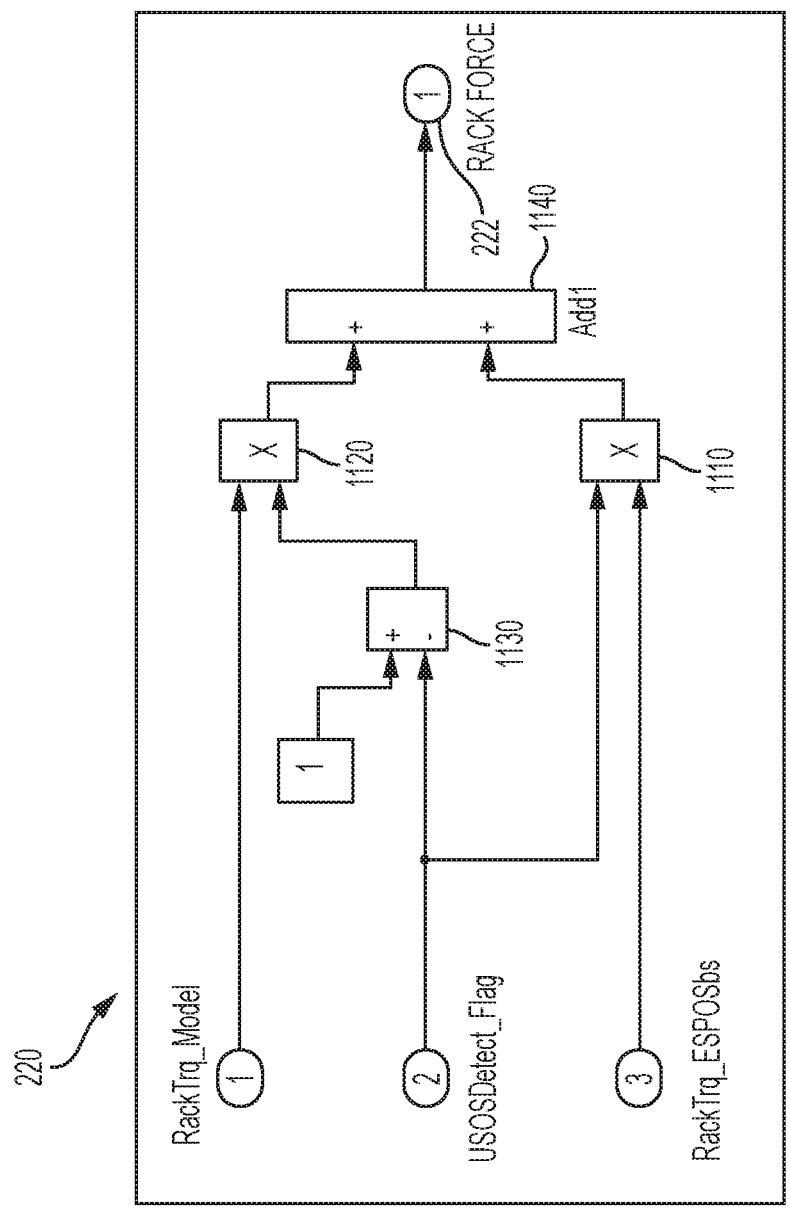
FIG. 11 depicts example components and data flow for a blending module, according to one or more embodiments.

FIG. 11 depicts example components and data flow for the blending module 220, according to one or more embodiments. The blending module 220 receives the first rack force from the rack force predictor module 232. In one or more examples, the rack force predictor module 232 generates the first rack force based on a preconfigured vehicle model, using vehicle speed and motor angle. The blending module 220 further receives the second rack force from the rack force predictor module 234. In one or more examples, the rack force predictor module 234 generates the second rack force using a rack force observer using a torque applied by the driver to the handwheel 14 and an assist torque generated by the steering system 12. The blending module 220 further receives the VMS flag 212.

In one or more examples, the blending module 220 computes a product of the value of the VMS flag 212 and the second rack force (or first rack force), as shown at 1110. The blending module 220 further computes a product of the first rack force (or second rack force) and a difference between a maximum value of the VMS flag and the value of the VMS flag 212, as shown at 1120. For example, if the VMS flag 212 is in the range [0, 1], as depicted in FIG. 11, the blending module computes (1−VMS flag) and multiplies the result with the first rack force (or second rack force), as shown at 1130 and 1120. The result of the two products described above are added and output as the rack force 222 to determine the Tref 242, as shown at 1140.

The technical features described herein facilitate the steering system 12 to detect near limit conditions and further classify the limit conditions into dynamic-state and steady state conditions to further identify what the driver is trying to do. Identifying the vehicle motion state is performed by comparing the rack force 222 predictions and resulting reference torque (Tref) 232 signals when the vehicle motion state system 200 described herein is turned on and off. For example, when the vehicle motion state system 200 is on, a drop in the rack force 222, and Tref torque helps the driver identify the tire limit.

The technical solutions described herein, thus, address a technical problem in a steering system, such as a closed-loop power steering system. For example, in closed-loop steering systems, assist-torque is provided based on an estimated/predicted rack force to determine driver efforts at the handwheel of the steering system. The steering system may receive rack force reference values from more than one source, such as a bicycle model rack force reference that offers uniform and smooth steering feel under normal (sub-limit) driving conditions, and a rack force observer reference that offers accurate effort communication at sub-limit and limit conditions at the expense of coarseness in feel.

The technical solutions herein determine vehicle state information using vehicle and EPS signals to determine limit conditions of the tire relaxation model, which facilitates using the use of the bicycle model rack force during the normal (sub-limit) driving conditions, and switching to the rack force observer model during limit maneuvers. The technical solutions herein thus facilitate the steering system to provide best of both worlds, in this case. Further, the technical solutions facilitate the steering system to blend the rack force predictions from both source using the vehicle state and condition information to ensure a uniform steering feel with accurate effort communication to the driver.

For example, using the technical solutions a steering system computes an assist torque by detecting a near-limit condition for a tire system and in response, determining a blending-factor, which is the VMS flag, based on a type of the near-limit condition. The steering system further generates a rack force signal by blending a first rack force from a vehicle model and a second rack force from a steering system observer model based on the blending-factor. The steering system further generates the assist torque based on the rack force signal, by converting the rack force signal into a reference torque signal.

In one or more examples, the near-limit condition is a dynamic-state condition, the dynamic-state being indicative of a handwheel speed of the steering system being above a predetermined threshold. Alternatively, or in addition, the near-limit condition is a steady-state condition, the steady-state being indicative of a handwheel speed of the steering system being below a predetermined threshold.

Further, detecting the near-limit condition includes computing a yaw-rate error and a yaw-acceleration error, and comparing the yaw-rate error and the yaw-acceleration error with a plurality of thresholds corresponding respectively to various of types of the near-limit condition. For example, the types of the near-limit condition may include a dynamic-state understeer condition, a dynamic-state oversteer condition, a steady-state understeer condition, and a steady-state oversteer condition.

Further, computing the yaw-rate error and the yaw-acceleration error includes generating a yaw-rate and a yaw-acceleration, generating a reference yaw-rate and a reference yaw-acceleration, and computing differences between the yaw-rate and the reference yaw-rate, and the yaw-acceleration and the reference yaw-acceleration as the yaw-rate error and the yaw-acceleration error respectively.

Further yet, in one or more examples, the thresholds for the various types of near-limit conditions are computed based on the vehicle-speed signal. Alternatively, or in addition, the thresholds are computed based on a surface-friction signal.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

What is claimed is:

1. A steering system comprising:
    a motor; and
    a control module that:
        computes a first yaw-rate and a yaw-acceleration based on a road-wheel angle signal, a vehicle-speed signal, and a measured yaw-rate signal;
        computes a state flag value that is indicative of a vehicle motion state using the first yaw-rate and the yaw-acceleration;
        generates a reference torque signal based on the state flag value;
        generates a motor-assist torque signal based on the reference torque signal; and
        applies the motor-assist torque signal to the motor for generating corresponding amount of torque.

2. The steering system of claim 1, wherein the state flag is computed based on a vehicle-speed signal, a yaw-rate signal, and an angle signal indicative of a position of a motor of the steering system.

3. The steering system of claim 1, wherein the vehicle motion state detected is a dynamic state.

4. The steering system of claim 1, wherein the vehicle motion state detected is a steady state.

5. The steering system of claim 1, wherein the reference torque signal is generated based on the state flag value by blending a first rack force generated based on a vehicle-speed signal and motor angle, and a second rack force generated based on a motor torque and an input torque provided to a handwheel of the steering system.

6. The steering system of claim 1, further comprising a reference yaw module configured to compute a reference yaw-rate and a reference yaw-acceleration based on the road-wheel angle signal, and the vehicle-speed signal, wherein the reference yaw-rate and the reference yaw-acceleration are used to compute the state flag.

7. The steering system of claim 6, further comprising an error calculation module configured to compute a yaw-rate error and a yaw-acceleration error by computing differences between the first yaw-rate and the reference yaw-rate, and between the yaw-acceleration and the reference yaw-acceleration, respectively, wherein the first yaw-rate and the yaw-acceleration are used to compute the state flag.

8. The steering system of claim 1, further comprising a condition threshold calculation module configured to compute a plurality of thresholds corresponding to each condition from a plurality of oversteer and understeer conditions.

9. The steering system of claim 8, wherein the thresholds are computed based on a vehicle-speed signal.

10. The steering system of claim 8, wherein the thresholds are computed based on a surface-friction signal.

11. A method for computing an assist torque by a steering system, the method comprising:
    detecting, by the steering system, a non-neutral vehicle motion state the detection comprising:
        computing a yaw-rate error and a yaw-acceleration error; and
        comparing the yaw-rate error and the yaw-acceleration error with a plurality of thresholds corresponding respectively to a plurality of types of the vehicle motion state;
    in response, determining a blending-factor based on a type of the vehicle motion state;
    generating a rack force signal by blending a first rack force from a vehicle model and a second rack force from a steering system observer model based on the blending-factor; and
    generating the assist torque based on the rack force signal.

12. The method of claim 11, wherein the vehicle motion state is a dynamic-state condition.

13. The method of claim 11, wherein the vehicle motion state is a steady-state condition.

14. The method of claim 11, wherein the plurality of types of the vehicle motion state comprise a dynamic-state understeer condition, a dynamic-state oversteer condition, a steady-state understeer condition, and a steady-state oversteer condition.

15. The method of claim 11, wherein computing the yaw-rate error and the yaw-acceleration error further comprises:
    generating a yaw-rate and a yaw-acceleration based on a road-wheel angle signal, a vehicle-speed signal, and a measured-yaw signal;

generating a reference yaw-rate and a reference yaw-acceleration based on the road-wheel angle signal and the vehicle-speed signal; and computing differences between the yaw-rate and the reference yaw-rate, and the yaw-acceleration and the reference yaw-acceleration as the yaw-rate error and the yaw-acceleration error respectively.

16. The method of claim 11, further comprising computing the plurality of thresholds based on a vehicle-speed signal.

17. The method of claim 11, further comprising computing the plurality of thresholds based on a surface-friction signal.

18. The method of claim 11, wherein the vehicle motion state is detected based on a vehicle-speed signal, a yaw-rate signal, and a motor-angle signal indicative of a position of a motor of the steering system.

* * * * *